United States Patent Office 3,580,735
Patented May 25, 1971

3,580,735
POLYOLEFIN-MOLDED ARTICLE HAVING GOOD ANTISTATIC PROPERTY AND PREPARATION OF THE SAME
Yutaka Shimodoi, Suita-shi, Heiichiro Ootake, Kouichi Mihara, and Kiyoshi Takao, Ibaragi-shi, and Shogo Matsuda, Tokyo, Japan, assignors to Asahi Kasei Kogyo Kabushiki Kaisha, Osaka, Japan
No Drawing. Filed Dec. 30, 1968, Ser. No. 788,005
Claims priority, application Japan, Dec. 30, 1967, 43/84,662, 43/84,663
Int. Cl. B44d 1/22
U.S. Cl. 117—138.8E                 6 Claims

ABSTRACT OF THE DISCLOSURE

In a polyolefin fiber, containing therein an internal antistatic agent such as quarternary ammonium salts, glycerides or higher fatty acid amides and a modifying agent selected from aluminum oxide, calcium chloride, calcium carbonate, diphenyl phthalate, tricresyl phosphate and polyethylene glycol, an improved article having more durable antistatic effect by coating the outer layer of the article with an external antistatic agent such as relatively high molecular vinyl polymer.

---

The present invention relates to a modified polyolefin composition and the preparation of the same. More particularly, the present invention relates to a polyolefin-molded article, especially fiber having a durable antistatic property, and the process for producing the same.

The polyolefin fiber displays its characteristic in the field of clothing and carpeting, but it also has a drawback of being easy to charge static electricity. As polyolefin is completely non-polar in nature, the drawback is emphasized in that good effectiveness resulted from applying an antistatic agent thereto is hardly obtained, and further the durability of the effect is considerably inferior, as compared with those of other synthetic fibers.

The method for blend-extruding the antistatic agent has been, hithertofore, studied widely. However, none of them are always generally effective method due to the difficulty for selecting modifying agent therefor. In particular, there are known none of method capable of giving by blend-extruding a durable antistatic effect to the polyolefin fiber inferior in processing properties.

The inventors have studied widely on the processing method of polyolefin fiber by the use of antistatic agent already known, and found that durable antistatic effects are not obtained. The present inventors have achieved the present invention as the result of precise and wide studies based on the introduction of a unique conception into the blend-extruding method.

An object of the present invention is to provide a polyolefin-molded article having a durable antistatic property.

Another object of the present invention is to provide a polyolefin fiber having a durable antistatic property.

Further object of the present invention is to provide a method of giving a durable antistatic property to a polyolefin-molded article, especially to a polyolefin fiber.

According to the present invention, there is provided an antistatic polyolefin-molded article comprising the mixture of at least one internal antistatic agent and at least one inorganic or organic modifying agent therein, and an external antistatic agent on the surface thereof, said external antistatic agent having a relatively high molecular weight as compared with that of said internal antistatic agent.

Such antistatic polyolefin-molded article is prepared according to the present invention by a method comprising molding the mixture of polyolefin with at least one internal antistatic agent and at least one inorganic or organic modifying agent, and applying an external antistatic agent which has a relatively high molecular weight as compared with that of said internal antistatic agent to the molded article.

Accordingly, a durable antistatic polyolefin fiber is produced by extruding into fiber a polyolefin capable of fiber-forming containing at least one internal antistatic agent and at least one inorganic or organic modifying agent both of which are stable under the condition of the spinning process, and applying the external antistatic agent to the polyolefin fiber.

It will be appreciated that the polyolefin fiber produced according to the present invention is distinct in remarkable durability of its antistatic property from that produced by spinning the mixture of polyolefin and either internal antistatic agent or inorganic or organic modifying agent alone.

The polyolefin fiber obtained according to the present invention reveals considerably superior antistatic property as compared with conventional ones, and the property does not become inferior not only in spinning and weaving steps but also scouring and dyeing steps. The antistatic property of the finished article does not remarkably lower in its durability even when the article is subjected to repeated washing and wearing.

It will be appreciated that the method of the present invention makes the use of poorly durable antistatic agent feasible and results in good durability. Thus, polyolefin fiber having a good-durable property can be obtained according to the present invention even in the use of antistatic agent which does not give a durable antistatic effect to polyolefin when using conventional method.

Furthermore, it will be noted that the antistatic polyolefin fiber obtained according to the present invention reveals no deterioration of such properties as tenacity, elongation and whiteness, comparing to those of conventional polyolefin fiber.

Polyolefin used in the present specification and claims is referred to polyethylene, polypropylene, polybutene, poly-4-methylpentene-1 or the like.

The modifying agents used in the present invention are calcium carbonate, calcium chloride, aluminum oxide (these compounds are preferably used in the form of a finely divided particle having a diameter of 0.05 to 10μ), polyethylene glycol having a molecular weight of 400 to 6000, diphenyl phthalate or tricresyl phosphate.

The term "internal antistatic agent" used in the specification and claim defines an antistatic agent used in the mixture with polyolefin before molding the polyolefin, and the term "external antistatic agent" defines an antistatic agent used in the application to the formed polyolefin article which has contained the internal antistatic agent and a modifying agent. It goes without saying that the internal antistatic agent must have not only antistatic effect in nature but also compatibility with polyolefin and heat-stability for molding. The following substance is useful for the purpose of the present invention.

(A) quaternary ammonium salts (as disclosed in Japanese patent application No. 9050/63) having the formula

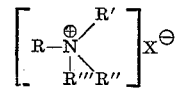

wherein R means an alkyl group having 8 to 20 carbon atoms, R' and R" are same or different and mean an alkyl group having 10 to 20 carbon atoms or polyethylene oxide residue having a polymerization grade of 10 to 50, R''' means an alkyl group having 1 to 4 carbon atoms or —CH₂COOH; and X means an anion of Cl, Br, I, SO₄, PO₄ or CH₃·SO₄.

(B) Glycerides which are obtained by substituting partially or completely 1 to 3 hydroxyl groups of glycerol with an aliphatic saturated acyl group having 6 to 20 carbon atoms (as disclosed in U.S. Pat. No. 2,758,984), or which are obtained by substituting 1 or 2 hydroxyl groups of glycerol with a suturated acyl group having 8 to 20 carbon atoms and then addition-condensing 5 to 50 moles of ethyleneoxide (as disclosed in Belgian Pat. No. 616,010).

(C) Higher fatty acid amides of the formula

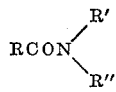

wherein R means an alkyl group having 10 to 20 carbon atoms, R' and R'' are same or different and mean an alkyl group having 1 to 3 carbon atoms or polyethylene oxide residue having a polymerization grade of 10 to 50, as disclosed in Belgian Pat. No. 668,881.

The external antistatic agents used in the present invention are preferably a polymer of a vinyl compound which contain an alkyl, a carboxyl, a glycidyl, an acyl or a sulfone group in the molecule, or a copolymer of such vinyl compound and other copolymerizable vinyl or allyl compound. The formula of the external antistatic agents are mentioned as below:

(A)

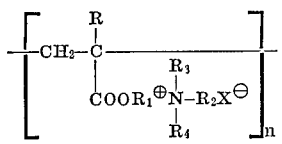

wherein R is a hydrogen atom, a methyl or ethyl group, $R_1$ is an alkylene group having 1 to 4 carbon atoms, $R_2$ and $R_3$ are an alkyl group having 1 to 4 carbon atoms, $R_4$ is an alkyl group having 1 to 4 carbon atoms or

—CH₂COOH

X is Cl, Br, or alkyl sulphate residue having 1 to 20 carbon atoms, and $n$ is a number above 10, as disclosed in U.S. Pat. No. 2,723,256.

(B)

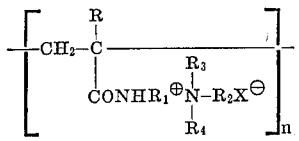

wherein R, $R_1$, $R_2$, $R_3$ X and $n$ are same as those of (A), and $R_4$ is an alkyl group having 1 to 4 carobn atoms, —CH₂COOH, —CH₂CONHCH₂OH or

as disclosed in Japanese patent publication No. 2610/59.

(C)

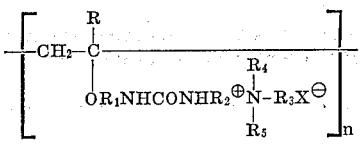

wherein R, $R_1$, X and $n$ are same as those of (A), $R_2$ is an alkylene group having 1 to 4 carbon atoms, $R_3$ and $R_4$ are an alkyl group having 1 to 4 carbon atoms, and $R_5$ is an alkyl group having 1 to 4 carbon atoms or —CH₂COOH.

(D)

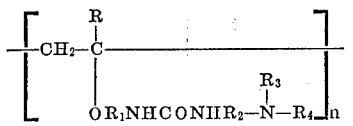

wheerin R, $R_1$, $R_2$, $R_3$, $R_4$ and $n$ are same as those of (C), as disclosed in U.S. Pat. No. 2,871,223.

In the practice of the present invention the internal antistatic agent is suitably used in an amount of 0.5 to 5 percent by weight on the basis of the polyolefin, and inorganic or organic modifying agent is suitably used in an amount of 0.3 to 5 percent by weight on the same basis. The polyolefin well-mixed with the above internal antistatic agent and modifying agent was extruded into fiber or filament under the common condition. The filament stretched or unstretched is immersed into an aqueous solution or dispersion containing 0.5 to 15 percent of the external antistatic agent at a room temperature of 60 to 100° C. for 3 to 60 minutes, and washed and dried. The treatment is carried out till the polyolefin takes up the external antistatic agent in an amount of 0.05 to 10.0 percent by weight, and preferably 0.1 to 5.0 percent of the polyolefin. Alternatively, the above treatment may be replaced by conventional method in which the filament is merely immersed, squeezed, dried and subjected to heat-treatment, or it is applied with the external antistatic agent by the use of spray method. In any cases, the same effect can be obtained.

The thus obtained polyolefin fiber retains its antistatic property after it is subjected to spinning, weaving or knitting, scouring and dyeing. Furthermore, the excellent antistatic property does not lower when the cloth or carpeting of the fiber is subjected to repeated washing and abrasion, showing remarkable durability.

As stated above, the internal and external static agents which have not been used because of their poor durability for polyolefin become feasible to use for the improvement of durability according to the present invention.

The present invention can be practised with same effect in polyolefin containing commonly used stabilizer, dyeable additive, fluorescent brightening agent and other additives.

The present invention displays same effect not only in fiber but also film, sheet and injection-formed articles.

Though it is not clearly understood why the durableness of the antistatic property of the polyolefin article, especially fiber, obtained by the method of the present invention is superior as compared with that of conventional article, the following reason will be considered. That is, in state that the internal antistatic agent has been incorporated alone into the polyolefin which is then extruded into fiber, the agent may probably migrate from the inner parts to surface of the fiber and break out thereon due to the extreme non-polarity of polyolefin. When subjected to washing, the agent may be washed away in the form of emulsion or dispersion by means of detergent, and the durableness of the antistatic property is lost. On the contrary, when treated with the relatively high molecular external antistatic agent having a smaller migration rate, the polyolefin fiber containing the inner antistatic agent and inorganic or organic modifying agent may be considerably improved in the durableness, since the both agents are mixed and consolidated in the part near the surface of the fiber. The inorganic or organic agent is considered to act as accelerator for consolidating the internal and external antistatic agents.

Thus, polyolefin fiber having antistatic property superior in durableness has been feasible by the skillful combination of the characteristic of the internal antistatic agent superior in heat-stability under extruding condition but poor in durableness and that of the external antiagent poor in heat-stability according to the present invention.

The present invention will be further precisely explained in the following examples which are not construed to restrict the invention thereto.

EXAMPLE 1

A mixture containing 96 percent by weight of polypropylene pellet (sold by Chisso Co.), 1 percent by weight of aluminum oxide having an average particle size of 0.5µ and 3 percent by weight of a quaternary ammonium salt derivative of the formula

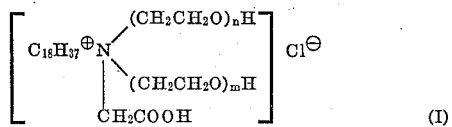

wherein n and m are an integer and the sum of them is 30, was extruded into filament at a temperature of 280° C. and stretched to three times of its length at a temperature of 120° C. to form a filament having 70 d./24 f. The thus obtained filament was immersed into an aqueous dispersion containing 3 percent by weight of polyaminoethyl methacrylate derivative of the formula

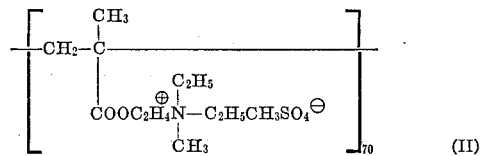

at a room temperature for 30 minutes. The ratio of the dispersion to the filament was 50:1. The filament taken from the bath was dried at 100° C. for 5 minutes, and the dried filament shows an excellent antistatic property. The filament shows also same tenacity, elongation as well as the sense of touch, as compared with the untreated filament. The filament retains an excellent durableness even after 30 times-repeated washing. In contrast, three kinds of filament coated with the polyaminoethyl methacrylate derivative of Formula II prepared from unmodified polypropylene, polypropylene containing 1 percent by weight of aluminum oxide, polypropylene containing the quaternary ammonium salt as mentioned above, respectively, according to the same method. All kinds of the filament show considerable deterioration of the antistatic property already after 3 times-repeated washing, despite they have excellent initial antistatic property.

The results of the test are showed in the following Table I.

TABLE I

| Agents (percent by weight) | | | Electric resistance (Ω)* | | | |
| --- | --- | --- | --- | --- | --- | --- |
| Aluminum oxide | Compound (I) | Compound (II) | Before washing | After washing 3 times | After washing 10 times | After washing 30 times |
| | | 3 | >10¹³ | | | |
| | | 3 | 6×10⁹ | 8×10¹² | | |
| 1 | | | >10¹³ | | | |
| 1 | | 3 | 4×10⁹ | 4×10¹² | | |
| | 3 | | 2×10⁸ | 8×10¹¹ | | |
| | 3 | 3 | 3×10⁸ | 2×10¹² | | |
| 1 | 3 | | 6×10⁷ | 3×10¹² | | |
| 1 | 3 | 3 | 3×10⁹ | 3×10¹⁰ | 5×10¹⁰ | 7×10¹⁰ |

*The electric resistance was measured by means of the electric microammeter sold by Takeda Riken Co., under the condition of a temperature of 20° C. and RH of 65 percent.

The washing was carried out by means of washing machine sold as trademark "UZ3400" by Toshiba Denki Co. using a detergent in a bath concentration of 2 g./l. sold as trademark "New beads" by Kao Sekken Co., under the condition of a bath ratio of 1:50 at a temperature of 40° C. The washing time was numbered in order as one cycle in which the washing is carried out for 10 minutes followed by washing with tap water.

The physical properties of the thus obtained filament are herein shown by the following Table II.

TABLE II

| Filament | Tenacity, g./d. | Elongation, percent | Young's modulus kg./mm.² |
| --- | --- | --- | --- |
| Unmodified | 6.2 | 35 | 352 |
| Obtained according to the invention | 5.9 | 35 | 350 |

NOTE: "Instron TM" was used in the above test.

From a half-knitted good knitted by the use of the polypropylene fiber produced by the method of the invention, an undershirt was prepared by sewing it.

The undershirt gives neither firm-feelings caused by the generation of static electricity to the body of a person who wear it, nor unpleasant sound when he put off the undershirt. Such characteristics are not altered at all even after 30 times-repeated putting on and washing.

EXAMPLE 2

From a mixture, containing 96.5 percent by weight of pelletized polypropylene having an average polymerization grade of 4,000, 0.5 percent by weight of calcium chloride having a particle size of 1µ and 3 percent by weight of oleylmonoglyceride, a filament of 50 d./24 f. was prepared as described in Example 1. The filament was treated with an aqueous dispersion containing 0.5 percent by weight of poly-N-substituted acrylamide of the formula in a bath ratio of 1:30 at a temperature of 70° C. for 10 minutes. After the tretament, the filament was dried at 110° C. for 3 minutes. The results of the test for durableness are shown in the following table.

TABLE III

| Agents (percent) | | | Electric resistance (Ω) | | | |
| --- | --- | --- | --- | --- | --- | --- |
| Calcium chloride | Oleylmonoglyceride | Compound (III) | Before washing | After washing 3 times | After washing 10 times | After washing 30 times |
| | | 5 | 7×10⁸ | 2×10¹¹ | | |
| 0.5 | | | >10¹³ | | | |
| 0.5 | | 5 | 7×10⁸ | 4×10¹² | | |
| | 3 | | 4×10⁸ | 2×10¹² | | |
| | 3 | 5 | 7×10⁸ | 5×10¹² | | |
| 0.5 | 3 | | 5×10⁷ | >10¹³ | | |
| 0.5 | 3 | 5 | 9×10⁶ | 3×10⁸ | 7×10⁹ | 7×10¹⁰ |

EXAMPLE 3

The filament of 180 denier 30 filaments was obtained by the procedures as described in Example 1 from a mixture containing 97.5 percent by weight of peletized polyolefin having an average polymerization grade of 3,800, 0.5 percent by weight of diphenylphthalate and 2 percent by weight of ethylen oxide addition product to an aliphatic carboxylic acid amide of the formula

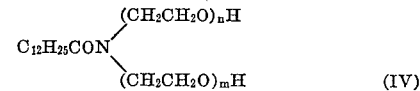

wherein m and n are same as defined in Formula I. The filament was treated with an aqueous dispersion containing 10 percent by weight of a polyaminoethylvinylether derivative of the formula

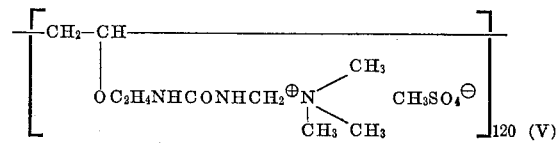

in a bath ratio of 1:40 at a temperature of 60° C. for 60 minutes, and dried at 80° C. for 7 minutes.

The results of the test on this filament are shown in the following table.

TABLE IV

| Agents percent | | | Electric resistance (Ω) | | | |
| --- | --- | --- | --- | --- | --- | --- |
| Diphenylphthalate | Compound (IV) | Compound (V) | Before washing | After washing 3 times | After washing 10 times | After washing 30 times |
| | | 10 | 2×10⁸ | 3×10¹² | | |
| 0.5 | | | >10¹³ | | | |
| 0.5 | | 10 | 3×10⁹ | 4×10¹² | | |
| | 2 | | 3×10⁸ | 3×10¹² | | |
| | 2 | 10 | 3×10⁹ | 3×10¹³ | | |
| 0.5 | 2 | | 6×10⁷ | 3×10¹² | | |
| 0.5 | 2 | 10 | 3×10⁷ | 4×10⁸ | 6×10⁹ | 2×10¹ |

EXAMPLE 4

The filament of 50 denier/24 filaments was prepared by the procedure as described in Example 1 from a mixture containing 93.5 percent by weight of pelletized polypropylene having an average polymerization grade of 4,000, 1.5 percent by weight of polyethylene oxide having a molecular weight of 4,000 and 5 percent by weight of ethylene oxide addition product to stearylmonoglyceride, of the formula

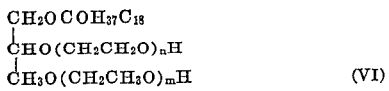  (VI)

wherein $m$ and $n$ are an integer and the sum of them is 20. The filament was treated with an aqueous dispersion containing 7 percent of a poly-N-substituted methacrylamide of the formula

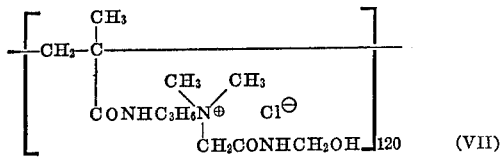  (VII)

at a temperature of 80° C. for 30 minutes in a bath ratio of 1:50, and dried at 100° C. for 10 minutes.

The results of the test are shown in the following table.

TABLE V

| Agents (percent) | | | Electric resistance ($\Omega$) | | | |
|---|---|---|---|---|---|---|
| Polyethylene oxide | Compound (VI) | Compound (VII) | Before washing | After washing 3 times | After washing 10 times | After washing 30 times |
| | | 7 | 3×10⁸ | 4×10¹² | | |
| 1.5 | | | >10¹³ | | | |
| 1.5 | | 7 | 1×10⁹ | 3×10¹² | | |
| | 5 | | 4×10⁸ | 7×10¹² | | |
| | 5 | 7 | 7×10⁷ | 3×10¹² | | |
| 1.5 | 5 | | 4×10⁷ | 8×10¹² | | |
| 1.5 | 5 | 7 | 2×10⁸ | 8×10⁹ | 2×10¹⁰ | 5×10¹ |

EXAMPLE 5

The yarn for carpeting was prepared by the use of pelletized polypropylene having a polymerization grade of 3,600. At first, a mixture containing 93.5 percent by weight of the polypropylene, 1.5 percent by weight of calcium carbonate having a particle size of 0.5μ and 5 percent by weight of an ethylene oxide addition product to an aliphatic carboxylic acid amide, of the formula

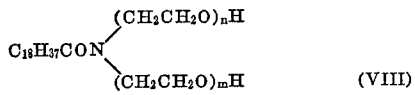  (VIII)

wherein $m$ and $n$ are an integer and the sum of them is 10, was prepared by well mixing the above components. The filament of 840 denier/24 filaments was produced by the procedure as described in Example 1. The thus obtained yarn for carpeting was treated with an aqueous dispersion containing 10 percent by weight of a polyaminomethyl methacrylate derivative of the formula

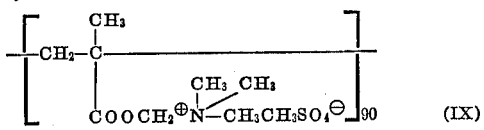  (IX)

in a bath ratio of 1:50 at a room temperature for 30 minutes, and dried at 100° C. for 5 minutes.

The results of the test are shown by the following table.

TABLE VI

| Agents (percent) | | | Static electricity by rubbing (V)* | | | |
|---|---|---|---|---|---|---|
| Calcium carbonate | Compound (VIII) | Compound (IX) | Before washing | After washing 3 times | After washing 10 times | After washing 30 times |
| | | 10 | >5,000 | 3,500 | >5,000 | |
| 1.5 | | 10 | >5,000 | 1,300 | >5,000 | |
| 1.5 | 5 | | 15 | 1,700 | 4,800 | >5,000 |
| | 5 | 10 | 70 | 1,100 | 3,400 | >5,000 |
| 1.5 | 5 | | 45 | 1,400 | 4,300 | >5,000 |
| 1.5 | 5 | 10 | 65 | 35 | 70 | 120 |

*Measured by rotary statistic tester with use of cow-leather at the rotating rate of 700 γ/min.

EXAMPLE 6

The 50 denier mono filament of polyethylene was prepared by well mixing 95 percent by weight of Ziegler-type polyethylene (sold as trademark "Hizex" by Mitsui Sekiyu Kagaku Co.), 3 percent of oleyl triglyceride and 2 percent by weight of tricresyl phosphate, extruding the mixture into filament at a temperature of 260° C. and stretching the filament to 9 times of length thereof. The thus obtained filament was treated with an aqueous solution containing 10 percent by weight of a poly-N-substituted acrylamide of the formula

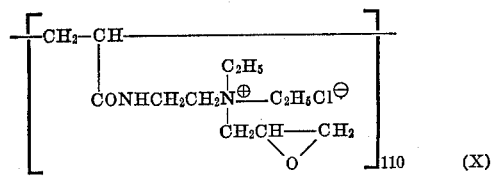  (X)

in a bath ratio of 1:50 at a room temperature for 10 minutes, and dried at 120° C. for 5 minutes.

No alteration of tenacity, elongation and Young's modulus are seen in the polyethylene filament, as compared with those of unmodified polyethylene filament. In addition, the filament shows excellent durableness of the antistatic property even after 30 times-repeated washing.

In contrast, three kinds of filament coated with the poly-N-substituted acrylamide of the Formula X prepared from unmodified polyethylene, polyethylene containing 2 percent by weight of tricresyl phosphate, and the same containing 3 percent by weight of oleyl triglyceride, respectively, according to the same method. All kinds of the filament thus obtained show considerable deterioration of the antistatic property already after 3 times-repeated washing, despite they have excellent initial antistatic property.

The results of the test are shown in the following table.

TABLE VII

| Agents (percent) | | | Electric resistance ($\Omega$) | | | |
|---|---|---|---|---|---|---|
| Tricresyl phosphate | Oleyl triglyceride | Compound (X) | Before washing | After washing 3 times | After washing 10 times | After washing 30 times |
| | | | >10¹³ | | | |
| | | 10 | 2×10⁸ | 5×10¹² | | |
| 2 | | | >10¹³ | | | |
| 2 | | 10 | 9×10⁸ | 4×10¹² | | |
| | 3 | | 6×10⁹ | 5×10¹² | | |
| | 3 | 10 | 5×10⁸ | 9×10¹¹ | | |
| 2 | 3 | | 2×10⁹ | 2×10¹² | | |
| 2 | 3 | 10 | 2×10⁸ | 4×10⁹ | 2×10¹⁰ | 7×10¹⁰ |

The physical properties of the filament involved are shown in the following table.

TABLE VIII

| Filament | Tenacity, g./d. | Elongation, percent | Young's modulus (kg./mm.²) |
|---|---|---|---|
| Unmodified | 5.9 | 13 | 380 |
| Obtained according to the invention | 5.1 | 14 | 350 |

What we claim is:

1. A polyolefin fiber having a durable anti-static effect, which comprises a polyolefin material containing 0.5 to 5.0% by weight of an internal antistatic agent selected from the group consisting of (a) a quaternary ammonium salt of the formula:

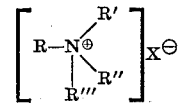

wherein R is an alkyl group of 8 to 20 carbon atoms; R' and R'' are the same or different and are alkyl groups of 10 to 20 carbon atoms or polyethylene oxide residues having a polymerization grade of 10 to 50; R''' is an alkyl group of 1 to 4 carbon atoms or —CH₂COOH; and X is Cl, Br, I, SO₄, PO₄ or CH₃SO₄; (b) a glyceride obtained by partially or completely substituting 1 to 3 hydroxyl groups in glycerol with an aliphatic saturated acyl group of 6 to 20 carbon atoms or a glyceride obtained by substituting 1 or 2 hydroxyl groups in glycerol with a saturated acyl group of 8 to 20 carbon atoms and then addition-condensing same with 5 to 50 moles of ethylene oxide; and (c) a higher fatty acid amide of the formula:

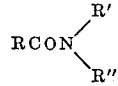

wherein R is an alkyl group of 10 to 20 carbon atoms and R' and R" are the same or different and are alkyl groups of 1 to 3 carbon atoms or polyethylene oxide residues having a polymerization grade of 10 to 50, and 0.3 to 5.0% by weight of a mobilizing agent selected from the group consisting of diphenyl phthalate, polyethylene glycol, tricresyl phosphate, aluminum oxide, calcium chloride and calcium carbonate; and on or near the surface of the fiber 0.05 to 10.0% by weight of a vinylic or acrylic polymeric material selected from the group consisting of materials having the formulas:

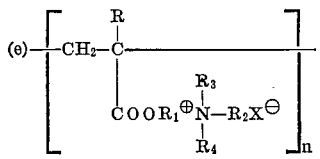

wherein R is hydrogen, methyl or ethyl; $R_1$ is an alkylene group of 1 to 4 carbon atoms, $R_2$ and $R_3$ are alkyl groups of 1 to 4 carbon atoms; $R_4$ is an alkyl group of 1 to 4 carbon atoms or —$CH_2COOH$; X is Cl, Br, or an alkyl sulfate residue of 1 to 20 carbon atoms and $n$ is a number greater than 10,

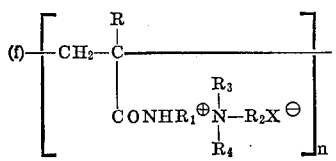

wherein R, $R_1$, $R_2$, $R_3$, X and $n$ are as defined above and $R_4$ is an alkyl group of 1 to 4 carbon atoms, —$CH_2COOH$, —$CH_2CONHCH_2OH$ or

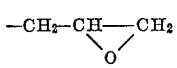

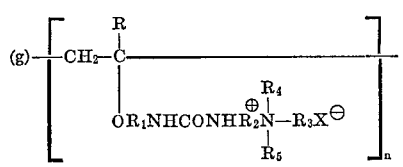

wherein R, $R_1$, X and $n$ are as defined above, $R_2$ is an alkylene group of 1 to 4 carbon atoms, $R_3$ and $R_4$ are alkyl groups of 1 to 4 carbon atoms and $R_5$ is an alkyl group of 1 to 4 carbon atoms or —$CH_2COOH$; and

wherein R, $R_1$, $R_2$, $R_3$, $R_4$ and $n$ are as defined above in (g).

2. A polyolefin fiber according to claim 1, wherein the polyolefin material is polypropylene.

3. A method for producing a polyolefin fiber having a durable antistatic effect, which comprises mixing a polyolefin with 0.5 to 5.0% by weight of an internal anti-static agent selected from the group consisting of (a) a quaternary ammonium salt of the formula:

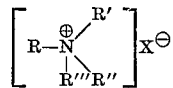

wherein R is an alkyl group of 8 to 20 carbon atoms; R' and R" are the same or different and are alkyl groups of 10 to 20 carbon atoms or polyethylene oxide residues having a polymerization grade of 10 to 50; R''' is an alkyl group of 1 to 4 carbon atoms or —$CH_2COOH$; and X is Cl, Br, I, $SO_4$, $PO_4$ or $CH_3SO_4$; (b) a glyceride obtained by partially or completely substituting 1 to 3 hydroxyl groups in glycerol with an aliphatic saturated acyl group of 6 to 20 carbon atoms or a glyceride obtained by substituting 1 or 2 hydroxyl groups in glycerol with a saturated acyl group of 8 to 20 carbon atoms and then addition-condensing same with 5 to 50 moles of ethylene oxide; and (c) a higher fatty acid amide of the formula:

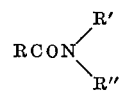

wherein R is an alkyl group of 10 to 20 carbon atoms atoms and R' and R" are the same or different and are alkyl groups of 1 to 3 carbont aoms or polyethylene oxide residues having a polymerization grades of 10 to 50, and 0.3 to 5.0% by weight of a mobilizing agent selected from the group consisting of diphenyl phthalate, polyethylene glycol, tricresyl phosphate, aluminum oxide, calcium chloride and calcium carbonate, melt-spinning the resulting mixture, applying to the resulting fiber a solution or dispersion of 0.5 to 15% by weight of a vinyl or acrylic polymeric material selected from the group consisting of materials having the formulas:

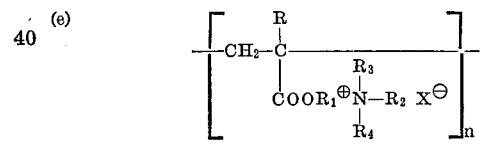

wherein R is hydrogen, methyl or ethyl; $R_1$ is an alkylene group of 1 to 4 carbon atoms, $R_2$ and $R_3$ are alkyl groups of 1 to 4 carbon atoms; $R_4$ is an alkyl group of 1 to 4 carbon atoms or —$CH_2COOH$; X is Cl, Br, or an alkyl sulfate residue of 1 to 20 carbon atoms and $n$ is a number greater than 10

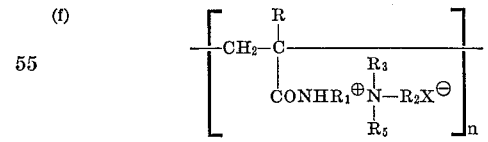

wherein R, $R_1$, $R_2$, $R_3$, X and $n$ are as defined above and $R_4$ is an alkyl group of 1 to 4 carbon atoms, —$CH_2COOH$, —$CH_2CONHCH_2OH$ or

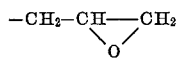

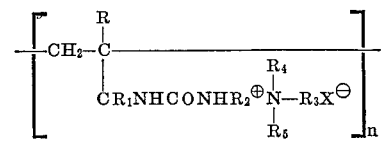

wherein R, $R_1$, X and $n$ are as defined above, $R_2$ is an alkylene group of 1 to 4 carbon atoms, $R_3$ and $R_4$ are alkyl groups of 1 to 4 carbon atoms and $R_5$ is an alkyl group of 1 to 4 carbon atoms or —$CH_2COOH$; and (h) 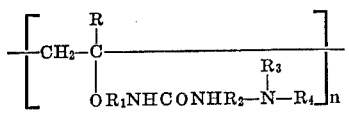

wherein R, $R_1$, $R_2$, $R_3$, $R_4$ and $n$ are as defined above in (g) and drying the fiber.

4. A method according to claim 3, wherein the polyolefin is polypropylene.

5. A method according to claim 3, wherein the application of the solution or dispersion is effected by immersion or spraying.

6. A method according to claim 3, wherein the drying is effected at a temperature of 60° to 100° C.

References Cited

UNITED STATES PATENTS

| | | | |
|---|---|---|---|
| 2,723,256 | 1/1955 | Hayek | 260—79.3 |
| 2,871,223 | 1/1959 | Hankins | 260—70 |
| 2,980,634 | 4/1961 | Melamed | 260—2.1AD |
| 2,996,466 | 8/1961 | Kessler et al. | 264—211AD |
| 3,219,639 | 11/1965 | Fuchs et al. | 260—80.5AD |
| 3,316,165 | 4/1967 | Pfeifer | 204—159.17 |
| 3,329,557 | 7/1967 | Mayat et al. | 260—857 |
| 3,329,758 | 7/1967 | Morgan | 264—211 |
| 3,361,701 | 1/1968 | Polack | 260—32.6 |
| 2,945,010 | 7/1960 | Caldwell et al. | 264—136X |
| 3,102,323 | 9/1963 | Adams | 8—130.1X |
| 3,195,975 | 7/1965 | Capruccio et al. | 8—115.5 |
| 3,215,487 | 11/1965 | Sapruccio et al. | 8—115.5 |
| 3,297,652 | 1/1967 | Tomiyama et al. | 260—75T |
| 3,316,336 | 4/1967 | Smith | 264—171 |
| 3,388,104 | 6/1968 | Crovatt | 260—785 |
| 3,423,314 | 1/1969 | Campbell et al. | 252—8.6 |

FOREIGN PATENTS

| | | | |
|---|---|---|---|
| 2,610 | 4/1959 | Japan | 264—211 |
| 15,252 | 8/1966 | Japan | 264—211 |

JAY H. WOO, Primary Examiner

U.S. Cl. X.R.

28—75; 161—176; 171—139.5A, 161UB, NC, 264—136, 211

UNITED STATES PATENT OFFICE
CERTIFICATE OF CORRECTION

Patent No. 3,580,735                 Dated May 25, 1971

Inventor(s) Yutaka Shimodoi et al.

It is certified that error appears in the above-identified patent and that said Letters Patent are hereby corrected as shown below:

In the heading to the printed specification, line 11, "43/84,662, 43/84,663" should read -- 42/84662, 42/84663 --.

Signed and sealed this 11th day of April 1972.

(SEAL)
Attest:

EDWARD M. FLETCHER, JR.                ROBERT GOTTSCHALK
Attesting Officer                      Commissioner of Patents